United States Patent [19]

Baugh

[11] 4,088,152

[45] May 9, 1978

[54] LOW FRICTION ELECTRO-HYDRAULIC PILOT VALVE

[75] Inventor: Benton F. Baugh, Houston, Tex.

[73] Assignee: Vetco Offshore Industries, Inc.

[21] Appl. No.: 678,994

[22] Filed: Apr. 21, 1976

[51] Int. Cl.² .............................................. F16K 11/06
[52] U.S. Cl. ................................. 137/625.65; 251/172
[58] Field of Search ................... 137/625.25, 625.48,
137/625.65, 625.68; 251/170, 171, 172, 174,
326, 327, 328, 329; 92/178

[56] References Cited

U.S. PATENT DOCUMENTS

| Re. 27,789 | 10/1973 | Tillman | 251/326 |
|---|---|---|---|
| 910,163 | 1/1909 | Benninghoff | 137/625.68 |
| 2,063,655 | 12/1936 | Barner | 251/174 |
| 2,291,563 | 7/1942 | Rotter | 137/625.68 |
| 3,324,888 | 6/1967 | Henderson | 137/625.68 |
| 3,482,816 | 12/1969 | Arnold | 251/174 X |
| 3,587,647 | 6/1971 | Walters | 137/625.25 |
| 3,761,054 | 9/1973 | Abdo | 137/625.48 |

Primary Examiner—Robert G. Nilson
Attorney, Agent, or Firm—Pravel, Wilson & Gambrell

[57] ABSTRACT

A solenoid actuated pilot valve for handling high pressure fluids wherein a single inlet and outlet shear seals are used on the gate which is mounted for movement on roller bearings to reduce frictional loads in moving the pilot valve gate in an unbalanced condition.

1 Claim, 4 Drawing Figures

LOW FRICTION ELECTRO-HYDRAULIC PILOT VALVE

BACKGROUND OF THE INVENTION

The present invention pertains to a new and improved solenoid actuated high pressure pilot valve which is particularly useful in remote locations where long signal lines are required, such as is the case with submerged christmas trees used with offshore oil production.

The electric power required to operate a solenoid valve is a function of the square of the force required and, therefore, any reduction in the force required to operate the valve will afford significant economics in both the construction and the operation of a solenoid actuated pilot valve. By way of example, if the force to operate a valve is cut in half, the power consumption is thereby reduced to one fourth the original amount. It will be readily apparent that sizable savings are afforded in long signal lines, such as remote subsea christmas trees, both from the standpoint of the cost of the initial installation and in the subsequent operating cost. Further, reduced power consumption lowers the heat built-up and thus also provides greater reliability.

Commonly high pressure control valves, i.e., 1,500 psi, employing symmetrically opposed seals on both the supply and output ports to pressure balance the gate and thereby minimize the frictional load on the gate. This arrangement, however, typically employs four seals with their inherent frictional forces against which any electric or spring force must move to actuate the valve.

SUMMARY OF THE INVENTION

The electro-hydraulic pilot valve of the present invention comprises a solenoid actuated gate mounted in the bore of a valve body with a shear seal at the inlet port and a shear seal at the discharge port for sealing with the gate. Roller means are provided on the discharge port side of the gate for reducing friction on the gate when moved between open and closed positions. With this invention, two shear seals rather than four cause friction on the gate thereby reducing the power requirements of the solenoid.

DESCRIPTION OF THE PREFERRED EMBODIMENT

Figure 1:
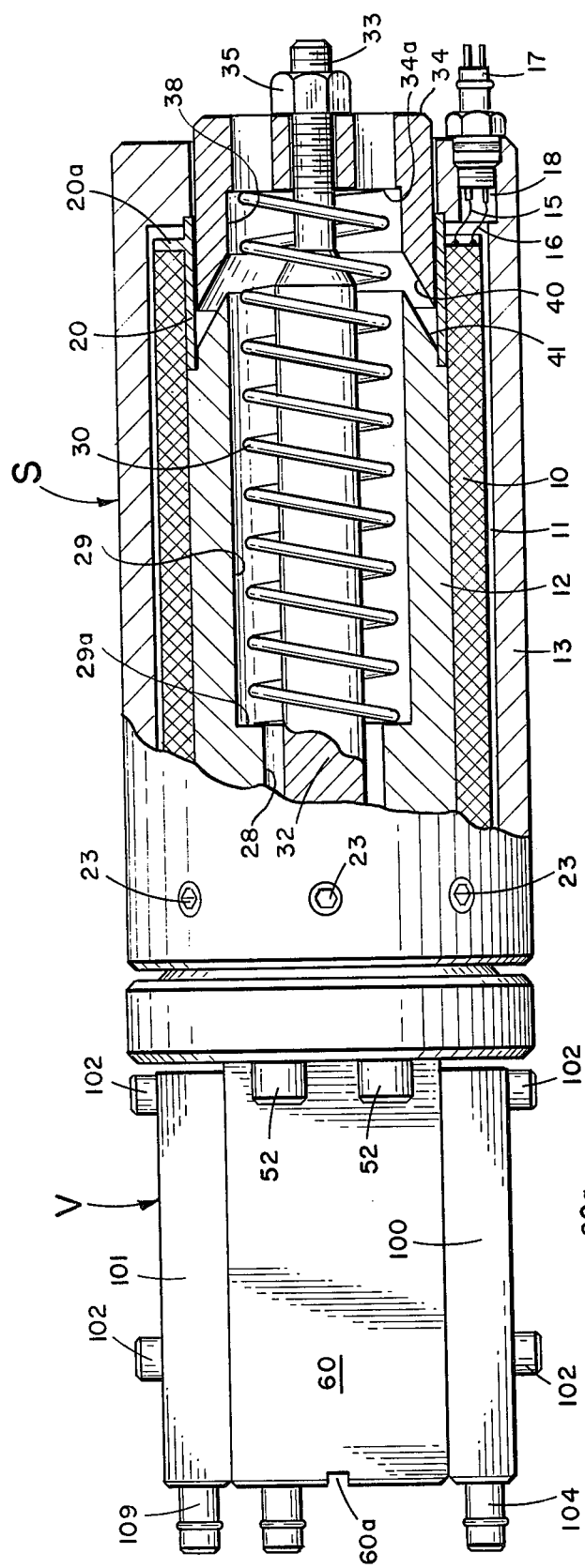
FIG. 1 is a longitudinal view, partly in elevation and partly in section, of the solenoid actuated pilot valve of the present invention.
Figure 2:
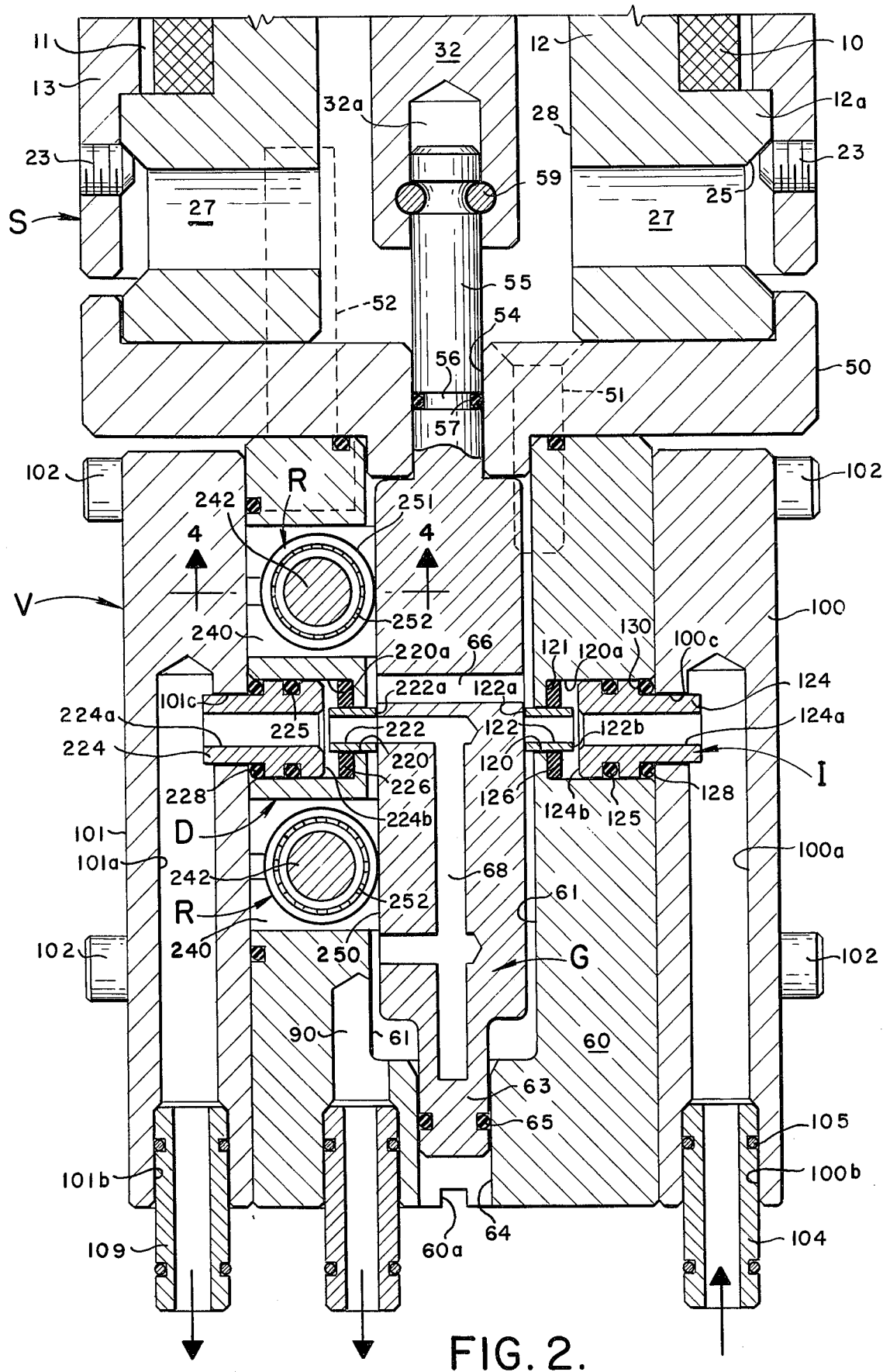
FIG. 2 is an enlarged cross-sectional view of the valve body illustrating details of construction of the gate, seals and bearings for the valve gate.

The solenoid actuated pilot valve of the present invention, illustrated in FIGS. 1 and 2 of the drawings, includes the solenoid S connected to the valve body V which houses a sliding gate member G mounted on rollers or needle bearings R. The valve body V includes a main bore connected by inlet and discharge passages I and D, respectively. The gate G is mounted on the rollers R to reduce the frictional load imposed on such gate when it is moved in an unbalanced condition to thereby reduce the power required of the solenoid S.

The relatively low power required by the pilot valve of the present invention makes it particularly suitable for remote installation, for example on offshore submerged wellheads and the like.

Considering now the apparatus of the present invention in more detail, the solenoid S comprises a wire coil 10 positioned in an annulus 11 between an inner mandrel 12 and an outer sleeve or cover 13 of ferromagnetic material which concentrates the magnetic field when an electric current is passed through the coil 10. A pair of leads 15 and 16 are shown for connecting the coil to some suitable external source of electric power (not shown). Such leads pass through a tube or conduit 17 which is secured in an opening 18 in the end of the sleeve 13.

The coil 10 is secured on the inner mandrel 12 by a tubular spacer 20 having an annular shoulder or projection 20a. An annular shoulder 12a is provided on the mandrel 12 for securing the coil at the opposite end. As shown, a plurality of circumferentially spaced set screws or locking members 23 engage an inwardly tapered surface 25 on the annular shoulder 12a to secure the sleeve 13 to the mandrel 12. Such annular shoulder 12a also includes a plurality of radially extending passages 27 which communicate with the main bore 28 of the mandrel 12 for ventilating the solenoid.

A counterbore 29 is formed in the mandrel 12 and is connected to the main bore 28 by an annular shoulder 29a which receives one end of the return spring 30. Such return spring 30 surrounds the solenoid plunger shaft 32 which is connected to the valve gate G for moving it between opened and closed positions as will be described in detail hereinafter. The plunger rod 32 has a threaded end portion 33 which is threadably connected to the cylindrical end cap member 34 and a lock nut 35 is provided for locking the end cap 34 in position on the threaded rod 33.

As shown, end cap 34 is provided with a bore 38 which is substantially the same size as the counterbore 29 and receives one end of the return spring 30. Such return spring engages the shoulder 34a to urge the nut 35 and the plunger 32 in a direction which will move the gate to a closed position as will be described in detail hereinafter. The end cap 34 also has a plurality of end passages 34a which communicate the bore 29 with the exterior of such end cap to facilitate ventilation of the solenoid.

The inner end of the end cap 34 is provided with a tapered shoulder 40 which is tapered at substantially the same angle as the adjacent tapered shoulder 41 on the end of the mandrel 12. When the end cap 34 is assembled on the plunger 32 an annular space 44 is provided which extends circumferentially around the mandrel 12 and permits the rod 32 to be moved longitudinally relative to the mandrel. Such movement is caused by the magnetic field set up in the mandrel 12 and the surrounding sleeve 13 when the coil 10 is energized. This causes the end cap 34 to be moved toward the tapered end 41 of the mandrel 12 and thereby moves the plunger shaft 32 relative to the valve body V.

As shown, an adapter plate 50 is positioned between the solenoid S and the valve V and is connected to such solenoid and valve by suitable screws 51 and 52, respectively. The adapter plate 50 has a central opening 54 through which the stem portion 55 of the valve gate G extends. As shown, such stem portion is provided with a suitable groove 56 for receiving an O-ring 57 which seals between the stem 55 and the wall of the opening 54. A pair of roll pins 59 secure the end of the stem portion 55 in an opening 32a in the end of the plunger 32. Thus connected, movement of the plunger 32 by the solenoid S approves similar movement of the valve gate G.

The valve V comprises a valve body 60 having a central bore 61, a counterbore 64, an inlet passage I, a discharge passage D and a relief vent passage 90. The valve body is provided with a laterally extending groove or relieved slot 60a which provides a leak path for fluid escaping past the "O"-ring seal 65 on the shaft 63. This groove permits fluid to escape from the valve block 60 rather than collect in passage 64 and obstruct the movement of the gate G.

The valve gate G is shown positioned in the bore 61 with a guide portion 63 disposed in a counterbore 64. An O-ring seal 65 is provided for sealing the guide portion 63 in the counterbore 64.

The valve gate G is provided with a transverse fluid passage 66 for conducting fluid from the inlet passage I to the outlet or discharge passage D when aligned between such passages I and D. A second fluid passage 68 is provided for conducting fluid from the outlet passage D to the vent passage 90 to relieve pressure in the output line when the valve is in the closed position, as illustrated in FIG. 2 of the drawings.

Side plates 100 and 101, respectively, are provided for connecting fluid lines or conduits (not shown) to the inlet and discharge ports I and D, respectively. Such plates are secured to the valve body V by means of screws 102. The side plate 100 is provided with a fluid passage 100a having a counterbore 100b for receiving a seal sub 104 which is sealed in the counterbore by means of an O-ring seal or other suitable seal means 105. The side plate 100 is also provided with a lateral passage 100c which is aligned with the inlet port I.

The side plate 101 is substantially identical to the side plate 100 and includes a main bore or passage 101a, a counterbore 101b and a lateral passage 101c aligned with the discharge port D. A seal sub 109 is connected in the counterbore 101b for attaching a suitable conduit.

As shown in FIG. 1, the inlet passage I in the valve body V comprises a small diameter bore 120 and a large diameter counterbore 120a which is aligned with and larger than the lateral passage 100c. An annular shoulder 121 is formed between the bore 120 and the counterbore 120a. A shear seal 122 is positioned in the inlet passage with its outer end 122a engaging the valve gate G and with its inner end 122b projecting inwardly into the counterbore 120 adjacent a valve pusher 124 which is positioned in the counterbore 120a and projects into the lateral passage 100c. A sealing means 126 is provided in the counterbore adjacent the annular shoulder 121 for providing a seal adjacent such annular shoulder. Such seal 126 surrounds the shear seal 122 and also seals around the outer circumference of the shear seal.

An O-ring seal 125 is provided in an annular groove in the valve pusher 124 for sealing between that pusher and the wall of the counterbore 120. A second O-ring seal member 128 is provided in the counterbore 120 between the upper shoulder of the seal pusher 124 and the annular shoulder formed around the inlet passage 100c.

It will be appreciated that fluid pressure introduced through the inlet passage 100a passes through the valve pusher passage 124a and acts on the annular surface 124b of such valve pusher to urge it outwardly compressing the O-ring seal 128 against the shoulder 130 to seal between the side plate 100 and the valve body V. Further, such fluid pressure acts on the inner end of the shear seal to urge it into sealing engagement with the valve gate G. When such gate is in the position shown in FIG. 2, the inlet passage I is blocked off. When the valve gate G is moved to align the transverse passage 66 with the inlet passage I, the shear seal seals against the valve gate around the circumference of the passage 66.

The discharge passage D and its associated shear seal and valve pusher are substantially identical to those with the inlet passage I. Briefly, the discharge or outlet passage D in the valve body V comprises a small diameter bore 220 and a large diameter counterbore 220a which is aligned with the lateral passage 101c. The shear seal 222 is positioned in the discharge or outlet passage D with its inner end 222a engaging the gate valve G and its outer end projecting inwardly into the counterbore 220. The valve pusher 224 is positioned in the counterbore 220a and projects into the lateral passage 101c with the surrounding seal means 226 surrounding the shear seal 222. O-ring seals 225 and 228 are provided in the counterbore 220a for sealing around the valve pusher when high pressure fluid passes through the transverse bore 66 into the discharge passage D. This high pressure fluid urges the shear seal 222 into sealing engagement with the valve gate G and also urges the valve pusher outwardly to compress the O-ring seal 228 against the side plate 101.

As shown in the drawings, the rollers R are mounted in recesses 240 in the valve body 60 on opposite sides of the discharge passage D. As the rollers R are identical, only one will be described in detail.

Figure 4:
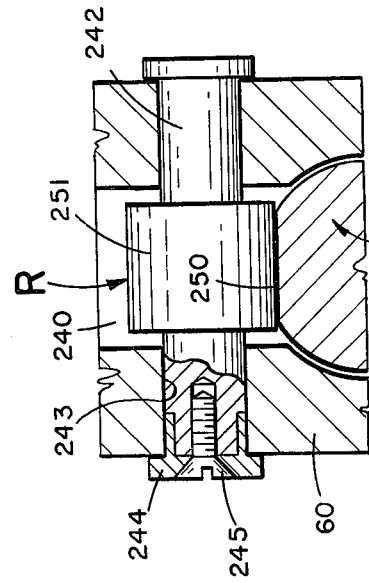
FIG. 4 is a sectional view taken on line 4—4 of FIG. 2 showing details of the gate bearings.
Figure 3:
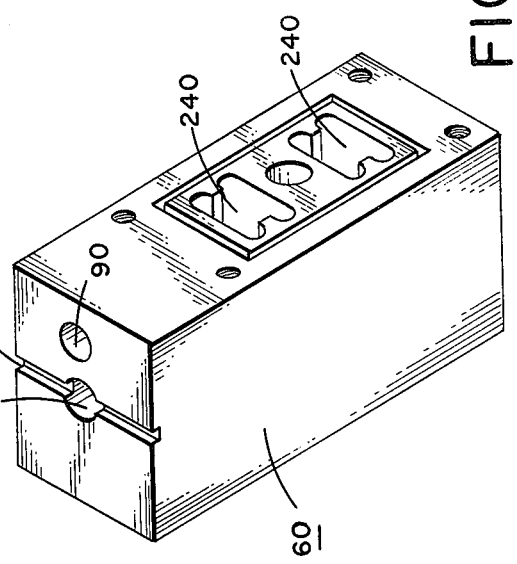
FIG. 3 is an isometric view of the valve housing in which the gate is carried.

As shown in FIG. 4 of the drawings, the rollers R comprise roller bearings mounted on a shaft or axle 242 which extends through a suitable opening 243 in the valve body 60. The axle is provided with an axle cap 244 which is removably secured to the end of the axle 242 by means of a threaded connection, such as a flathead screw 245. As shown, the valve gate G is provided with a flat surface 250 which engages the sleeve 251 surrounding the needle bearings 252 in the roller R.

Valve gate G thus mounted on the rollers R, the frictional forces which must be overcome by the spring 30 in the solenoid S is substantially reduced. It will be appreciated that in the closed position shown in FIG. 1 of the drawings, the supply pressure which comes in through the passage 100a goes through the shear seal passage 120 and is blocked off by the valve gate G. The non-balanced force imposed on the gate valve in this position is taken by the needle bearings and the rollers R so that the solenoid S must overcome the friction from only one seal and the two needle bearings in addition to the force or bias created by the spring 30.

If the solenoid S is actuated, it moves to the right as shown in FIG. 1 of the drawings until the passage 66 in the Further, it will be appreciated that when the gate is returned to the position shown in FIG. 1, fluid in the output line will pass through the valve body and then to the vent passage 109 to relieve the pressure imposed when the valve gate was opened.

The foregoing disclosure and description of the invention are illustrative and explanatory thereof, and various changes in the size, shape, and materials as well as in the details of the illustrated construction may be made without departing from the spirit of the invention.

I claim:
1. In an electro-hydraulic pilot valve comprising a valve body with a main bore for receiving a valve gate mounted for movement therein and a counterbore for receiving a gate guide, a high pressure inlet passage in said valve body; a high pressure outlet passage in said valve body, and a pressure relief passage in said valve body communicating the main bore, said valve gate means including a flow through passage for connecting said high pressure inlet passage and said high pressure outlet passage when said valve gate is in the open position and a bypass passage in said valve gate for communicating said high pressure outlet passage and said pressure relief passage when said gate is moved to the closed position and solenoid means for moving the valve gate to the open position, the improvement comprising:

a spaced pair of rollers positioned to engage the side of said valve gate adjacent said high pressure outlet, single shear seals in said valve body adjacent said high pressure inlet passage, and said high pressure outlet passage for sealing said flow through passage when said valve gate is in the open position and said bypass passage when said valve gate is in the closed position; and a fluid release passage communicating the counterbore for discharging fluid leaking passed the gate guide into the counterbore.

* * * * *